UNITED STATES PATENT OFFICE.

ADAM FULLWILER, OF TULE RIVER, CALIFORNIA.

INSECTICIDE.

SPECIFICATION forming part of Letters Patent No. 373,396, dated November 15, 1887.

Application filed April 13, 1887. Serial No. 234,701. (No specimens.)

*To all whom it may concern:*

Be it known that I, ADAM FULLWILER, a citizen of the United States, residing at Tule River, in the county of Tulare and State of California, have invented a new and useful Composition of Matter to be used as an Insecticide, of which the following is a specification.

My composition consists of the following ingredients, combined, substantially, in the proportions stated, viz: Lye from wood-ashes, five gallons; lime-water, one and one-half gallon; lard, one pound; salt, one pound; blue-stone, four ounces; tobacco, one pound. In compounding this preparation I use lye made from wood-ashes, the lye being of a strength sufficient to bear an egg, and I mix therewith the lime-water, which should be strong. I then add to the mixture the lard and the salt, and mix and boil all together. I now dissolve the blue-stone in about two quarts of hot water, and I steep the tobacco also in two quarts of water. Then I pour the two solutions last named into the mixture of the lye, lime-water, lard, and salt, at a milk-warm temperature.

The compound is for the purpose of destroying insects, scale, and other pests, which infest trees, shrubs, plants, flowers, &c. It is applied at a milk-warm temperature by means of a brush, broom, or spray.

For trees and shrubs I dilute three gallons of the compound with two gallons of water. For plants and flowers I dilute it still more, by mixing three gallons of water with but two of the compound.

Having thus described my invention, what I claim as new, and desire to secure by Letters Patent, is—

The herein-described composition of matter to be used as an insecticide, consisting of lye, lime-water, lard, salt, blue-stone, and tobacco, combined substantially in the proportions described.

In witness whereof I have hereunto set my hand.

ADAM FULLWILER.

Witnesses:
J. O. LOVEJOY,
M. H. WALSH.